United States Patent
Du

(10) Patent No.: US 11,080,894 B2
(45) Date of Patent: Aug. 3, 2021

(54) SKIN COLOR DETECTION METHOD, SKIN COLOR DETECTION APPARATUS, AND STORAGE MEDIUM

(71) Applicant: GUANGZHOU BAIGUOYUAN INFORMATION TECHNOLOGY CO., LTD., Guangzhou (CN)

(72) Inventor: Lingxiao Du, Guangzhou (CN)

(73) Assignee: BIGO TECHNOLOGY PTE. LTD., Mapletree Business (SG)

( * ) Notice: Subject to any disclaimer, the term of this patent is extended or adjusted under 35 U.S.C. 154(b) by 0 days.

(21) Appl. No.: 16/647,246

(22) PCT Filed: Sep. 14, 2018

(86) PCT No.: PCT/CN2018/105682
§ 371 (c)(1),
(2) Date: Mar. 13, 2020

(87) PCT Pub. No.: WO2019/056986
PCT Pub. Date: Mar. 28, 2019

(65) Prior Publication Data
US 2020/0258260 A1    Aug. 13, 2020

(30) Foreign Application Priority Data
Sep. 19, 2017 (CN) .......................... 201710852345.3

(51) Int. Cl.
*G06T 7/90* (2017.01)
*G01J 3/50* (2006.01)

(52) U.S. Cl.
CPC .................. *G06T 7/90* (2017.01); *G01J 3/50* (2013.01); *G06T 2207/10024* (2013.01); *G06T 2207/30196* (2013.01)

(58) Field of Classification Search
CPC ............. G06T 7/90; G06T 2207/10024; G06T 2207/30196; G06T 3/00; G01J 3/50;
(Continued)

(56) References Cited

U.S. PATENT DOCUMENTS

2007/0043527 A1*  2/2007  Quan ................... G06K 9/4652
                                                                    702/104
2007/0104472 A1*  5/2007  Quan ....................... G03B 7/08
                                                                    396/79
(Continued)

FOREIGN PATENT DOCUMENTS

CN         101482923 A       7/2009
CN         102096823 A       6/2011
(Continued)

OTHER PUBLICATIONS

First office action of Chinese application No. 201710852345.3 dated Jul. 30, 2019.
(Continued)

*Primary Examiner* — Ali Bayat
(74) *Attorney, Agent, or Firm* — Dilworth & Barrese, LLP

(57) ABSTRACT

A skin color detection method comprises: determining chrominance signal values in a luminance chrominance YUV domain of a pixel value corresponding to each pixel point in a target image under skin color detection; searching for a skin color probability corresponding to the chrominance signal values in a stored skin color index matrix based on the chrominance signal values in the YUV domain of the pixel value corresponding to the pixel point, wherein the skin color index matrix is generated through processing skin color images under various illumination conditions, and the skin color probability is a probability that the pixel point is a skin color point; and performing skin color detection based on the skin color probability corresponding to the chromi-
(Continued)

Determine, for each pixel point in a target image to be subjected to skin color detection, a chrominance signal value of a pixel value — 101

Search for a skin color probability value corresponding to the chrominance signal value in a stored skin color index matrix on the basis of the chrominance signal value of the pixel value corresponding to the pixel point in the YUV region — 102

Carry out skin color detection on the basis of the skin color probability value corresponding to the chrominance signal value of each pixel point in the target image — 103 nance signal values of each pixel point in the target image. A skin color detection apparatus and a storage medium are further provided.

18 Claims, 3 Drawing Sheets

(58) Field of Classification Search
CPC ............ G06K 9/00362; G06K 9/6215; G06K 9/4652; G06K 9/00; G06K 9/46; G06K 9/62
USPC .......................................................... 382/162
See application file for complete search history.

(56) References Cited

U.S. PATENT DOCUMENTS

| | | | | |
|---|---|---|---|---|
| 2009/0303336 | A1* | 12/2009 | Utsugi | G06T 7/11 348/222.1 |
| 2010/0158363 | A1* | 6/2010 | Jiang | G06K 9/4652 382/165 |
| 2010/0220899 | A1* | 9/2010 | Steinberg | H04N 9/68 382/118 |
| 2011/0299771 | A1* | 12/2011 | Cheddad | G06K 9/4652 382/165 |
| 2014/0036109 | A1* | 2/2014 | Steinberg | G06K 9/00 348/234 |
| 2017/0154238 | A1 | 6/2017 | Li | |

FOREIGN PATENT DOCUMENTS

| | | |
|---|---|---|
| CN | 102521607 A | 6/2012 |
| CN | 102779268 A | 11/2012 |
| CN | 103745193 A | 4/2014 |
| CN | 105913460 A | 8/2016 |
| CN | 106529432 A | 3/2017 |
| CN | 106845455 A | 6/2017 |
| CN | 107633252 A | 1/2018 |
| JP | 2004-246424 A | 9/2004 |

OTHER PUBLICATIONS

Notification to grant patent right for invention of Chinese application No. 201710852345.3 dated Feb. 7, 2020.

Douglas Chai et al,"Face Segmentation Using Skin-Color Map in Videophone Applications", IEEE Transactions on Circuits and Systems for Video Technology, Jan. 1, 1999 (Jan. 1, 1999), p. 551; abstract, figure 5, p. 4, right column, second paragraph, starting "I I I. Face-Segmentation Algorithm", p. 5, right column, first paragraph, starting "With this skin-color map", p. 5, right column, second last paragraph, starting "Among all the stages".

Guo Liang Yang et al,"Research on a Color Detection Algorithm Based on Self-adaptive Skin Color Model", Communications and Intelligence Information Security (ICCIIS), 2010 International Conference on, IEEE, Piscataway, NJ, USA, Oct. 13, 2010 (Oct. 13, 2010), pp. 266-270; abstract, figure 1, p. 2, left column, lines 3-13, p. 2, left column, lines 13-20, p. 2, right column, second paragraph, starting "III. Gaussian Model".

Chen Aiping et al,"Face Detection Technology Based on Skin Color Segmentation and Template Matching", Education Technology and Computer Science (ETCS), 2010 Second International Workshop on IEEE, Piscataway, NJ, USA, Mar. 6, 2010 (Mar. 6, 2010), pp. 708-711, abstract, figures 2, 3, From "C. Skin color clustering features in the YCbCr color room" To Fig. 3; p. 2.

Extended European search report of counterpart EP application No. 18859472.5 dated Sep. 29, 2020.

* cited by examiner

SKIN COLOR DETECTION METHOD, SKIN COLOR DETECTION APPARATUS, AND STORAGE MEDIUM

CROSS-REFERENCE TO RELATED APPLICATION

This application is a National Stage of International Application No. PCT/CN2018/105682, filed on Sep. 14, 2018, which claims priority to Chinese Patent Applications No. 201710852345.3 filed with the China National Intellectual Property Administration on Sep. 19, 2017 and entitled "SKIN COLOR DETECTION METHOD, SKIN COLOR DETECTION DEVICE AND STORAGE MEDIUM", the entire contents of which are incorporated herein by reference.

TECHNICAL FIELD

The present disclosure relates to a skin color detection method, a skin color detection apparatus, and a storage medium.

BACKGROUND

With the development of image processing technologies, skin color detection is more and more widely used in daily life as an important technology. Skin color detection is mainly intended to select a corresponding color range in an image as a skin color according to an inherited color of the skin, which is also a process of selecting pixel points in a region where the skin is located in the image. The pixel points in the region where the skin color is located are also referred to as skin color points.

Generally, skin color detection may be performed on images captured under various illumination conditions. For example, skin color detection is performed on images captured in an indoor environment, a natural lighting environment, a yellow lighting environment, a back lighting environment. In related arts, skin color detection may be performed in two manners. In the first manner, a large quantity of skin color images may be acquired, pixel value corresponding to respective pixel point in the acquired skin color images is statistically collected, and the statistically collected pixel value is substituted to the Bayes formula to calculate a probability that the pixel point corresponding to the pixel value is a skin color point. In the second manner, a pixel value of respective pixel point in the skin color images is statistically collected. When the pixel value is within a predetermined range, it is determined that the pixel point corresponding to the pixel value is a skin color point; and when the pixel value is not within the predetermined range, it is determined that the pixel point corresponding to the pixel value is not a skin color point.

However, in the first manner, since there is a huge calculation load for the Bayes formula, and during calculating by using the Bayes formula, and the illumination condition for the pixel point corresponding to the pixel value is required to be unchanged, the probability calculated by using the Bayes formula may not be applicable to the skin color images captured under all the illumination conditions. In the second manner, due to influence of illumination, the pixel values corresponding to some skin color points may fluctuate beyond the predetermined range in both directions. Therefore, results obtained by detection according to the second manner are not continuous, and it is possible that the detection results for the same skin color point under different illumination conditions are different. As such, the accuracy of skin color detection on dynamic images is low. For example, due to the influence of illumination, the pixel values of some skin color points in a video may typically fluctuate beyond the predetermined range in both directions. Therefore, it is possible that detection results for the same skin color point are not consistent, that is, some pixel points are detected as a skin color point while the pixel points are not detected as a skin color point.

SUMMARY

Various embodiments of the present disclosure provide a skin color detection method, comprising:

determining a chrominance signal value of a pixel value corresponding to each pixel point in a target image under skin color detection in a luminance chrominance YUV domain; acquiring images carrying the skin color points under various illumination conditions; generating a binary image based on the chrominance signal values in the YUV domain of a pixel value of each skin color point in the acquired images carrying the skin color points; obtaining a distance matrix through distance transformation based on the pixel value of each pixel point in the binary image; determining the skin color index matrix based on the distance matrix; searching for a skin color probability corresponding to the chrominance signal value from the skin color index matrix based on the chrominance signal value of the pixel value corresponding to the pixel point in the YUV domain; wherein the skin color index matrix is generated after skin color images under various illumination conditions are processed, and the skin color probability refers to a probability that the pixel point is a skin color point; and performing skin color detection based on the skin color probability corresponding to the chrominance signal value of each pixel point in the target image.

Various embodiments of the present disclosure provide a skin color detection apparatus, comprising a processor, a memory and at least one program code stored on the memory and executable on the processor; wherein the processor, when executing the at least one program code, performs the method as defined above.

Various embodiments of the present disclosure provide a computer-readable storage medium storing at least one instruction; when being executed by a processor, causing the processor to perform the method as defined above.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure will be described in further detail with reference to the accompanying drawings, to present the objects, technical solutions, and advantages of the present disclosure more clearly.

For ease of understanding, prior to detailed interpretation and description of embodiments of the present disclosure, application scenarios of the embodiments of the present disclosure will be introduced first.

Skin color detection, as an important technology in image processing, is being more and more widely used in daily life. In practice, the skin color detection may be applied in various fields. Hereinafter, application scenarios of skin color detection are exemplarily described.

For example, in images or videos, lightening and whitening are required for a face region. After acquiring an image or video frame containing the human face, which pixel points in the image are skin color points may be determined by skin color detection. A region formed by the determined skin color points is taken as a skin region, and thus the skin color region is lightened and whitened, thereby achieving a retouching effect.

Still for example, when user identity verification is identified by face recognition, after an image or video frame containing the human face is acquired, which pixel points are skin color points may be determined by skin color detection, and a region formed by the determined skin color points is taken as a skin region. Afterwards, face detection is performed on the skin region, to more quickly and more effectively implement face recognition.

Further, gesture recognition is exemplified. When functions such as selection and confirmation, page switch, zoom-in and zoom-out, and rotation and the like of a smart television are completed through gestures, generally after an image is acquired, which pixel points are skin color points needs to be determined through skin color detection to determine a skin region corresponding to the skin color points in the image, and hence static or dynamic gesture detection is performed on the skin region, to quickly complete gesture recognition and achieve an effect of controlling the smart television.

The embodiments of the present disclosure are not only applicable to the above three application scenarios. In practice, the embodiments may further be applicable to other application scenarios, which are not described herein any further.

Hereinafter, a skin color detection method according to the embodiments of the present disclosure is described in detail.

Figure 1:
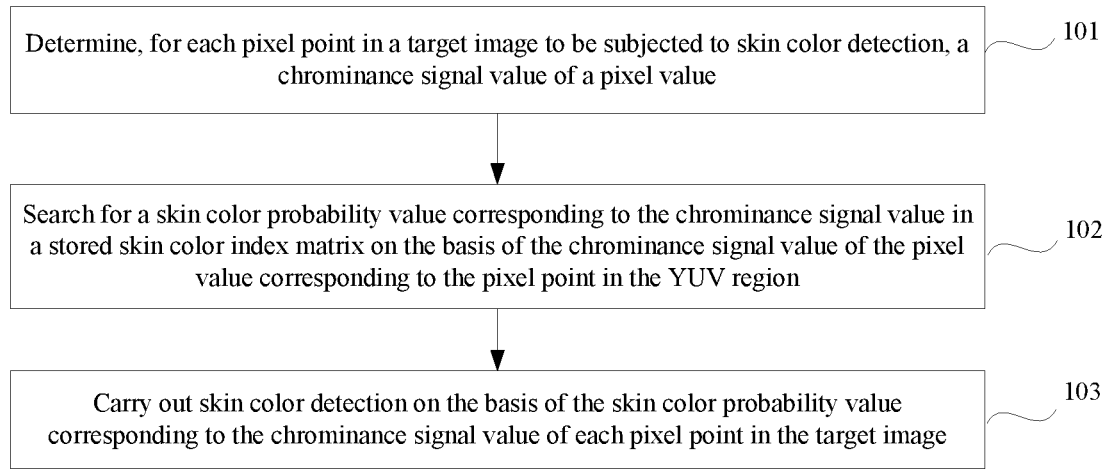
FIG. 1 is a flowchart of a skin color detection method according to an embodiment of the present disclosure.

FIG. 1 is a flowchart of a skin color detection method according to an embodiment of the present disclosure. Referring to FIG. 1, the method comprises the following steps:

Step 101: Chrominance signal values in a luminance chrominance YUV domain of a pixel value corresponding to each pixel point in a target image under skin color detection are determined.

Step 102: A skin color probability corresponding to the chrominance signal value is searched for from a stored skin color index matrix based on the chrominance signal values of the pixel value corresponding to the pixel point in the YUV domain.

The skin color index matrix is generated by processing skin color images under various illumination conditions, and the skin color probability refers to a probability that the pixel point is a skin color point.

Step 103: Skin color detection is performed based on the skin color probability corresponding to the chrominance signal value of each pixel point in the target image.

Since the skin color index matrix is obtained through processing the skin color images under various illumination conditions, determining the probability that the pixel point in the target image is the skin color point through the skin color index matrix can be applicable to various illumination conditions. In this way, the problems that detection results under different illumination condition are inaccurate and the detection results are not consistent are avoided, the accuracy of skin color detection is improved, and various subsequent processings on the skin color point in the image are facilitated.

In some embodiments of the present disclosure, prior to that the skin color probability corresponding to the chrominance signal value is searched for from the stored skin color index matrix based on the chrominance signal values of the pixel value corresponding to the pixel point in the YUV domain, the method further comprises:

acquiring images carrying skin color points under various illumination conditions;

generating a binary image based on the chrominance signal values of a pixel value of each skin color point in the image carrying the skin color points; and obtaining a distance matrix by distance transformation based on the pixel value of each pixel point in the binary image; and determining the skin color index matrix based on the distance matrix.

In some embodiments of the present disclosure, generating the binary image based on the chrominance signal values of the pixel value of each skin color point in the image carrying the skin color points comprises:

generating a chrominance signal value image, wherein chrominance signal values of pixel values of pixel points in the chrominance signal value image in the YUV domain are arranged in predetermined directions in an ascending order;

determining, based on the chrominance signal value of the pixel value of each skin color point in the skin color image in the YUV domain, a probability that each pixel point in the chrominance signal value image is the skin color point; and setting the pixel value of the pixel point with the probability being greater than or equal to a predetermined pixel threshold in the chrominance signal value image to 1, and setting the pixel value of the pixel point with the probability being less than the predetermined pixel threshold to 0, so as to obtain the binary image.

In some embodiments of the present disclosure, determining the skin color index matrix based on the distance matrix comprises:

determining a maximum distance value in the distance matrix;

determining a skin color probability corresponding to each distance in the distance matrix based on the distance matrix and the maximum distance value; and generating the skin color index matrix based on the skin color probability corresponding to each distance in the distance matrix.

In some embodiments of the present disclosure, determining the skin color probability corresponding to each distance in the distance matrix based on the distance matrix and the maximum distance value comprises:

determining the skin color probability corresponding to each distance in the distance matrix based on the distance matrix and the maximum distance value through the following formula:

$$SkinValue = \exp\left(-\frac{dis * disThres}{\max dis}\right) * 255.0,$$

in the above formula, SkinValue denotes a skin color probability corresponding to each distance in the distance matrix, dis denotes a distance in the distance matrix, diThres denotes a predetermined distance threshold, and max dis denotes a maximum distance value in the distance matrix.

In some embodiments of the present disclosure, generating the skin color index matrix based on the skin color probability corresponding to each distance in the distance matrix comprises:

generating, based on the skin color probability corresponding to each distance in the distance matrix, the skin color index matrix according to arrangement of the distance matrix; or rounding the skin color probability corresponding to each distance in the distance matrix, and generating, based on the rounded skin color probability, the skin color index matrix according to arrangement of the distance matrix.

All the above optional technical solutions may form optional embodiments of the present disclosure in any combination, which will not be elaborated herein in the embodiment of the present disclosure.

Figure 2:
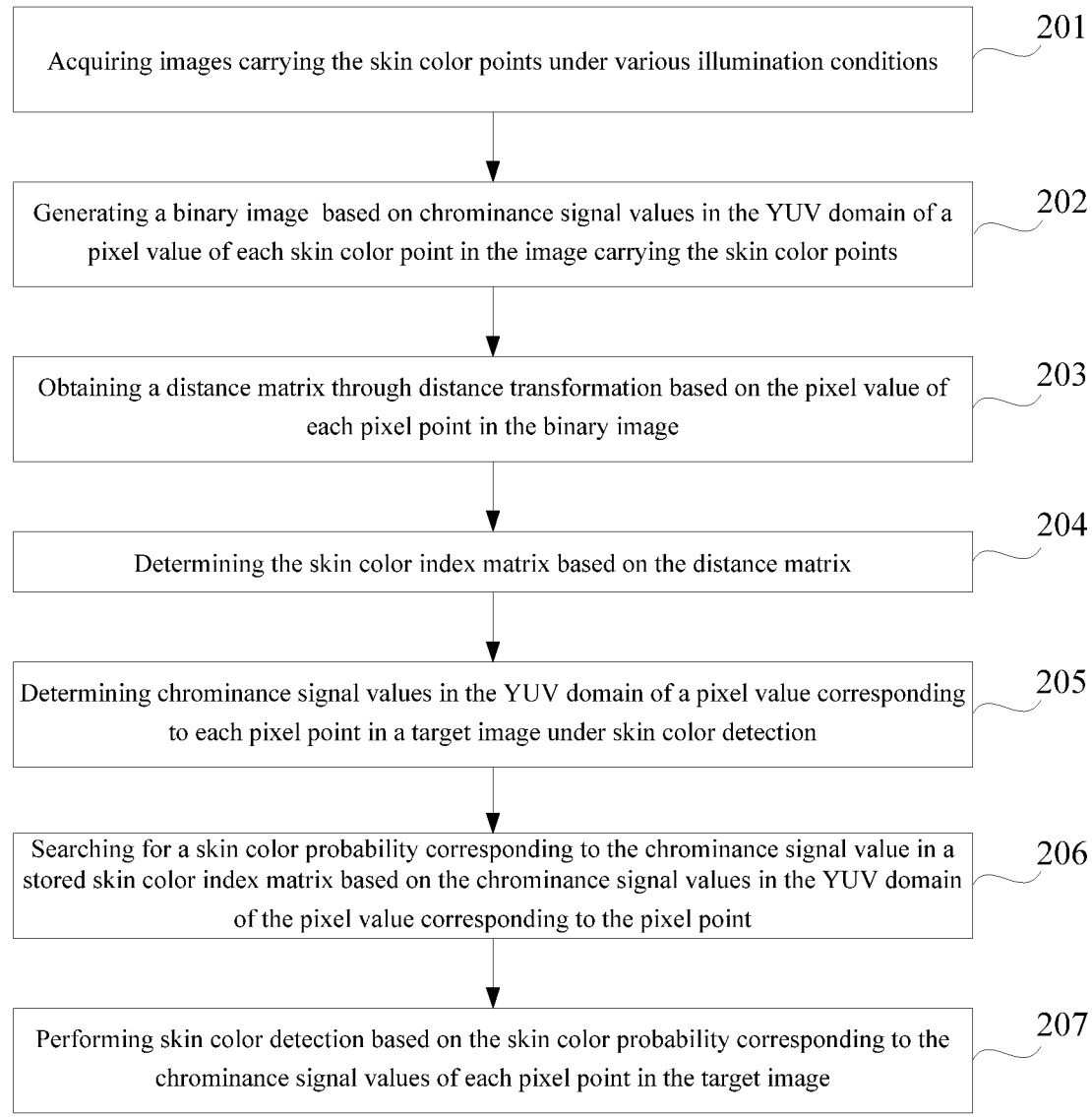
FIG. 2 is a flowchart of a skin color detection method according to another embodiment of the present disclosure.

FIG. 2 is a flowchart of a skin color detection method according to an exemplary embodiment of the present disclosure. Hereinafter, the embodiment as illustrated in FIG. 1 is described with reference to FIG. 2. Referring to FIG. 2, the method comprises the following steps:

It should be noted that, in practice, prior to skin color detection on a target image, a skin color index matrix may be generated through steps 201 to 204 firstly.

Step 201: Images carrying the skin color points are acquired under various illumination conditions.

In practice, skin color detection needs to be performed on images captured under various illumination conditions, and different illumination conditions may cause different skin color detection results. Therefore, in order to improve the accuracy of skin color detection, the images carrying the skin color points under various illumination conditions may be acquired.

For example, images carrying the skin color points in an indoor environment, a natural lighting environment, a yellow lighting environment, a counter lighting environment and the like different illumination conditions may be acquired.

Step 202: A binary image is generated based on chrominance signal values in the YUV domain of a pixel value of each skin color point in the image carrying the skin color points.

It should be noted that, representing a color space by the YUV domain is a color coding method adopted for European television systems, which is a color space employed in Phase Alteration Line (PAL) and Sequentiel Couleur A Memoire (SECAM) analog color television modes. In modern color television systems, a three-tube color camera or a color charge-coupled device (CCD) camera are generally employed for capturing an image, and then captured color image signals are subjected to color separation, amplification and correction respectively, to obtain an red green blue (RGB) image. Afterwards, the RGB image is processed by a matrix transformation circuit to obtain a luminance signal Y and two chrominance signal B-Y (that is, U) and R-Y (that is, V). Finally, a transmitting end respectively encodes the three signals, namely the luminance signal Y, the chrominance signal U and the chrominance signal V, and then transmits the signals over the same channel. In this method, the color space is represented by the YUV domain. The significance of this representation method is that the luminance signal Y is separated from the chrominance signals U and V.

It should be further noted that the binary image refers to an image where the pixel points are all black or white, with no transition color. In a grayscale image, the pixel value of a black pixel point is 0, and the pixel value of a white pixel point is 255. For ease of representation, in the binary image, the pixel value of the pixel point having the pixel value 255 is re-set to 1, and the pixel value of the pixel point having the pixel value 0 is maintained. That is, the pixel value corresponding to each pixel point comprised in the binary image may only be either 1 or 0.

Specifically, generating the binary image based on the chrominance signal values in the YUV domain of the pixel value of each skin color point in the acquired image carrying the skin color points may comprise: generating a chrominance signal value image, chrominance signal values in the YUV domain of pixel values of pixel points in the chrominance signal value image are arranged in predetermined directions in an ascending order; determining, based on the chrominance signal values in the YUV domain of the pixel value of each skin color point in the image, a probability that each pixel point in the chrominance signal value image is the skin color point; setting the pixel value of the pixel point with the probability being greater than or equal to a predetermined pixel threshold in the chrominance signal value image as 1, and setting the pixel value of the pixel point with the probability being less than the predetermined pixel threshold as 0, so as to obtain the binary image.

The predetermined directions refer to arrangement directions of the chrominance signals, and may be predefined. For example, the predetermined directions may be a direction from the left to the right in which the values of the chrominance signals U are arranged, and a direction from the bottom to the top in which the values of the chrominance signals V are arranged. The predetermined pixel threshold may be predefined, and is intended to judge whether a pixel value is a pixel value corresponding to the skin color point. For example, the predetermined pixel threshold may be 0.8.

It should be noted that, since the chrominance signal value image is generated by arranging the chrominance signal values in the YUV domain of the pixel values of the pixel points in predetermined directions in an ascending order, and chrominance signal values in the YUV domain of the pixel values of the pixel points are values in the range between 0 and 255, the generated chrominance signal value image is an image of 256*256, and the binary image generated based on the chrominance signal image is also an image of 256*256.

For example, the value of the chrominance signal U is taken as a horizontal axis, the values of the chrominance signals U are sequentially arranged from 0 to 255 in the direction from the left to the right; and the value of the chrominance signal V is taken as a vertical axis, the values of the chrominance signals V are sequentially arranged from 0 to 255 in the direction from the bottom to the top, such that the chrominance signal value image is generated. It is assumed that 100 skin color images are acquired, and a quantity of pixel points in the 100 skin color images corresponding to each pair of chrominance signal values in the chrominance signal value image is determined. Assuming that with respect to one pair of chrominance signal values (5, 10), and the other pair of chrominance signal values (8, 12), in the acquired 100 skin color images, there are 80 skin images where the pixel points with the pair of chrominance signal values (5, 10) are the skin color points, and there are 60 skin color images where the pixel points with the pair of chrominance signal values (8, 12) are the skin color points, then it may be determined that the probability that the pixel points corresponding to the chrominance signal values (5, 10) in the chrominance signal value image is 0.8, and the probability that the pixel points corresponding to the chrominance signal values (8, 12) in the chrominance signal value image is 0.6. Assuming that the predetermined pixel threshold is 0.7, then since 0.8 is greater than 0.7, the pixel values of the pixel points corresponding to the chrominance signal values (5, 10) may be set to 1; and further, since 0.6 is less than 0.7, the pixel values of the pixel points corresponding to the chrominance signal values (8, 12) may be set to 0.

Step 203: A distance matrix is obtained through distance transformation based on the pixel value of each pixel point in the binary image.

The distance transformation is a transformation for the binary image. In a binary image, it may be considered that only target pixel points and background pixel points are comprised. The pixel values of the target pixel points are 1, and the pixel values of the background pixel points are 0.

A distance between each pixel point in the binary image and a closest pixel point with the pixel value 1 is determined, and the distance matrix is generated based on the determined distance. The distance value of the pixel point with the pixel value 1 in the distance matrix is 0, and the closer to the pixel point with the pixel value 1 is, the distance value of the pixel point is smaller.

It should be noted that when the binary image is placed in a coordinate system, each pixel point may have its respective coordinate values, and the distance between each pixel point in the binary image and the closest pixel point with the pixel value 1 is calculated through the following formula:

$$d = \sqrt{(x-x_0)^2 + (y-y_0)^2}$$

in the above formula, d denotes a distance between each pixel point in the binary image and a closest pixel point with the pixel value 1, (x, y) denotes coordinates of the pixel point, and ($x_0$, $y_0$) denotes coordinates of the pixel point with the pixel value 1 that is closest to the pixel point.

It should be noted that the above formula is a continuous function, and the distance value between each pixel point and the closest pixel point with the pixel value 1 is also continuous. That is, a smooth and continuous curve may be drawn based on coordinates of a pixel point, coordinates of a pixel point with the pixel value 1 that is closest to the pixel point and a distance value between each pixel point and a closest pixel point with the pixel value 1. Continuous points on the curve represent the distance between each pixel point and the closest pixel point with the pixel value 1. Therefore, the distance value in the distance matrix is a continuous value.

Step 204: The skin color index matrix is determined based on the distance matrix.

The skin color index matrix is generated through processing skin images under various illumination conditions, and the skin color probability refers to a probability that the pixel point is a skin color point.

Specifically, determining the skin color index matrix based on the distance matrix comprises: determining a maximum distance value in the distance matrix; determining a skin color probability corresponding to each distance in the distance matrix based on the distance matrix and the maximum distance value; and generating the skin color index matrix based on the skin color probability corresponding to each distance in the distance matrix.

Determining the skin color probability corresponding to each distance in the distance matrix based on the distance matrix and the maximum distance value comprises: determining the skin color probability corresponding to each distance in the distance matrix based on the distance matrix and the maximum distance value through the following formula:

$$SkinValue = \exp\left(-\frac{dis * disThres}{\max dis}\right) * 255.0$$

In the above formula, SkinValue denotes a skin color probability corresponding to each distance in the distance matrix, dis denotes a distance in the distance matrix, disThres denotes a predetermined distance threshold, and max dis denotes a maximum distance value in the distance matrix. The predetermined distance threshold can be intended to regulate the amplitude of variations of the skin color probability in the skin color index matrix. The smaller the predetermined distance threshold is, the smaller the amplitude of the variations of the skin color probability is; and on the contrary, the larger the predetermined distance threshold is, the larger the amplitude of the variations of the skin color probability is.

It should be noted that in the above formula, the value of $$\exp\left(-\frac{dis * disThres}{\max dis}\right)$$

is multiplied by 255, such that the calculation result is introduced into a 256*256 matrix for ease of search. In practice, the value of $$\exp\left(-\frac{dis * disThres}{\max dis}\right)$$

may also not be multiplied by 255, such that a value in the range of 0 to 1 is obtained, and this value is taken as the probability that a pixel point is the skin color point. Based on the distance matrix and the maximum distance value, the skin color probability corresponding to each distance in the distance matrix may further be determined in other ways, which is not limited in the present disclosure.

Specifically, generating the skin color index matrix based on the skin color probability corresponding to each distance in the distance matrix comprises: generating, based on the skin color probability corresponding to each distance in the distance matrix, the skin color index matrix according to arrangement of the distance matrix; or rounding the skin color probability corresponding to each distance in the distance matrix, and generating, based on the rounded skin color probability, the skin color index matrix according to arrangement of the distance matrix.

It should be noted that the skin color probability corresponding to each distance in the determined distance matrix may be a float type value. In this case, based on the skin color probability, the skin color index matrix is generated according to arrangement of the distance matrix. In this way, the skin color detection based on the generated skin color index matrix is more accurate. However, since the skin color probability in such generated skin color index matrix is the float type value which just represents the probability that the pixel point is the skin color point, the pixel point may be determined as the skin color point when the probability satisfies a predetermined condition. And it is not convenient for float type data to be calculated. Therefore, the skin color probability corresponding to each distance in the distance matrix may be rounded, and based on the rounded skin color probability, the skin color index matrix is generated according to the arrangement of the distance matrix.

It should be further noted that since the distance values in the distance matrix are continuous values, and the skin color index matrix is determined based on the distance matrix, the skin color probabilities in the skin color index matrix are also continuous values. In the generated skin color index matrix, the skin color probability 0 indicates that the pixel point corresponding to the chrominance signal value must not be the skin color point, the skin color probability 255 indicates that the pixel point corresponding to the chrominance signal value is definitely the skin color point, and the skin color probability in the range of between 0 and 255 indicates the probability that the pixel point corresponding to the chrominance signal value is the skin color point.

In the embodiment of the present disclosure, since the generated skin color index matrix is obtained through transformations of continuous distances, the skin color probabilities in the obtained skin color index matrix are also continuous. Accordingly, regarding a video frame, since the skin color probabilities, obtained due to constant variations of the adjacent pixel values caused by factors such as lighting and the like, are also constantly variable, and jumps due to use of the threshold may not be caused, such that the accuracy of skin color detection is improved.

After the skin color index matrix is generated through the above steps, when skin color detection needs to be performed on the target image, skin color detection may be implemented through steps 205 to 207.

Step 205: Chrominance signal values in the YUV domain of a pixel value corresponding to each pixel point in a target image under skin color detection is determined.

It should be noted that, in practice, skin color in the image needs to be detected in many scenarios. That is, pixel points in a region where the skin is located need to be selected from the image. Since the skin color needs to be detected, it is required to judge whether the pixel point in the image is the skin color point. Therefore, for each pixel point in the target image under skin color detection, the chrominance signal values in the YUV domain of the pixel value corresponding to the pixel point is determined, wherein the chrominance signal values in the YUV domain of the pixel value corresponding to the pixel point is the value of chrominance signal U or V.

It should be further noted that, if the target image under skin color detection is an image in the YUV domain, with respect to each pixel point in the target image under skin color detection, the chrominance signal values in the YUV domain of the pixel value corresponding to the pixel point is determined. That is, the values of the chrominance signals U and V in the YUV domain of the pixel value corresponding to the pixel point in the target image are determined. If the target image under skin color detection is an image in an RGB domain, the image in the RGB domain needs to be converted to an image in the YUV domain, and then the values of the chrominance signals U and V in the YUV domain of the pixel value corresponding to the pixel point in the target image are determined from the image in the YUV domain.

For example, when the target image under skin color detection is an image in the YUV domain, assuming that the target image under skin color detection comprises three pixel points, three pairs of chrominance signal values in the YUV domain of the pixel values corresponding to the three pixel points are 5 and 10, 8 and 12, and 9 and 14, respectively.

Step 206: A skin color probability corresponding to the chrominance signal value is searched for in a stored skin color index matrix based on the chrominance signal values in the YUV domain of the pixel value corresponding to the pixel point.

Based on the chrominance signal values in the YUV domain of the pixel value of each pixel point in the target image, the skin color probability corresponding to the chrominance signal value is searched for in the stored skin color index matrix, wherein the skin color probability is the probability that the pixel point corresponding to the chrominance signal values is the skin color point.

For example, the chrominance signal values in the YUV domain of the pixel value corresponding to a pixel point in the target image under skin color detection are 5 and 10, it is found from the stored skin color index matrix that the skin color probability corresponding to the chrominance signal values 5 and 10 of the pixel value is 0.8. That is, the probability that the pixel point corresponding to the chrominance signal values 5 and 10 is the skin color point is 0.8.

Step 207: Skin color detection is performed based on the skin color probability corresponding to the chrominance signal values of each pixel point in the target image.

It should be noted that in practice, skin color detection based on the skin color probability corresponding to the chrominance signal values of each pixel point in the target image can be performed in the following two possible implementations. Nevertheless, in practice, skin color detection based on the skin color probability corresponding to the chrominance signal values of each pixel point in the target image may be performed in other manners, which is not limited in the present disclosure.

In a first possible implementation, when it is determined based on the searched skin color probability satisfies a predetermined skin color condition, the pixel point is determined as the skin color point.

The predetermined skin color condition may be predefined according to different requirements. For example, the predetermined skin color condition may be whether the skin color probability searched based on the chrominance signal values in the YUV domain of the pixel value of the pixel point is greater a predetermined value.

For example, the predetermined skin color condition may be whether the skin color probability searched based on the chrominance signal values in the YUV domain of the pixel value of the pixel point is greater than 0.7. With respect to the target image under skin color detection, assuming that with respect to a pixel point in the target image, the skin color probability corresponding to the pixel values in the YUV domain of the pixel point which is searched in the skin color index matrix is 0.8. Since 0.8 is greater than 0.7, the pixel point is determined as the pixel point.

Still for example, with respect to the target image under skin color detection, the skin color probability of the chrominance signal values in the YUV domain of the pixel value of a pixel point is searched for. In this case, a probability may be determined for each pixel value in the target image, and the target image is entirely lightened. With respect to the processed target image, the skin color probability of the chrominance signal values in the YUV domain of the pixel value of a pixel point is determined, and a probability is accordingly determined for each pixel point in the processed target image. An average value is taken between the probability corresponding to each pixel pint in the processed target image and the probability corresponding to each pixel point in the target image prior to processing, and then the pixel point with the probability being greater than the predetermined value is determined as the skin color point.

Still for example, with respect to the target image under skin color detection, the target image under skin color detection is divided into a plurality of rectangular regions using rectangular frame, the skin color probability corresponding to the chrominance signal values in the YUV domain of the pixel value of each pixel in each rectangular region is determined, and then the average value of the skin color probabilities of the pixel points in the rectangular region is taken as the probability that the pixel points in this region are the skin color points. When the probability is greater than the predetermined value, all the pixel points in this region are determined as the skin color points.

In a second possible implementation, the skin color probability corresponding to the chrominance signal values of each pixel point in the target image is specifically applied to an application scenario to achieve the objective of skin color detection.

Where the skin color points in the target image need to be processed, all the pixel points in the target image may be processed first to obtain a first processed image. Afterwards, based on the skin color probability corresponding to the chrominance signal values of each pixel in the target image, the pixel values of the pixel points in the target image and the pixel values of the pixel points in the processed image are mixed to obtain the pixel values of the pixel points after processing. Based on the pixel values, a final processed image is generated. In the final processed image, the skin color points are only processed, such that skin color detection is implemented.

For example, when the skin color points in the target image need to be lightened, all the pixel points in the target image are lightened first to obtain a processed image. Afterwards, based on the skin color probability in the skin color index matrix, the pixel values of the pixel points in the target image and the pixel values of the pixel points in the processed image are mixed to obtain pixel values of pixels in the image in which the skin color is lightened. Assuming that the pixel values of the skin color points in the target image need to be increased by 30, then the pixel value of each pixel point in the target image is increased by 30 to obtain a processed image. Afterwards, the probability that the pixel value of each pixel point in the target image is the skin color point is searched for in the skin color index matrix.

Assuming that a pair of chrominance signal values of a pixel point in the target image are 120 and 110, a pair of chrominance signal values of the pixel point in the processed image are 150 and 140, and it is determined from the skin color index matrix that the probability that the pixel point corresponding to the chrominance signal values is the skin color point is 0.9, then chrominance signal values 120 and 110 in the target image are respectively multiplied by 0.1 to obtain another pair of chrominance signal values 12 and 11. Afterwards, the pair of chrominance signal values 150 and 140 of the pixel point in the processed image are respectively multiplied by 0.9 to obtain another pair of chrominance signal values 135 and 126. Then, the chrominance signal values 12 and 11 are correspondingly added to the chrominance signal values 135 and 126 to obtain final chrominance signal values of the pixel point, 147 and 137. Based on the final chrominance signal values 145 and 137, an image where the skin color is lightened is finally generated. In this image, only the skin color points in the target image are lightened.

In the embodiment of the present disclosure, as an image comprises a plurality of pixel points, skin color can be detected by determining whether the pixel points are skin color points. When skin color detection needs to be performed on a target image, with respect to each pixel point in the target image, chrominance signal values in the YUV domain of the pixel value of the pixel point can be determined, such that a skin color probability corresponding to the chrominance signal values in the YUV domain is searched for in a stored skin color index matrix based on the chrominance signal values of the pixel value corresponding to the pixel point, and hence skin color detection is performed based on the skin color probability corresponding to the chrominance signal values of each pixel point in the target image. Since with respect to any image or video frame, a probability that a pixel point is a skin color point can be quickly searched in the skin color index matrix based on the chrominance signal values of the pixel point, which is applicable to application scenarios such as retouching video and the like where real-time performance is strictly required. In addition, since the generated skin color index matrix is obtained through continuous distance transformations, the skin color probabilities in the obtained skin color index matrix are also continuous. Accordingly, with respect to a video frame, since the skin color probabilities obtained due to constant variations of the pixel values in adjacent frames caused by factors such as lighting and the like are also constantly variable, and jumps due to use of the threshold may not be caused. Since the skin color index matrix is obtained through processing the skin color images under various illumination conditions, determining the probability that the pixel point in the target image is the skin color point through the skin color index matrix can be applicable to various illumination conditions. In this way, the problem that detection results under different illumination conditions are inaccurate is avoided, the accuracy of skin color detection is improved, and it is convenient to perform various processing on the skin color point in the image.

The method according to the embodiments of the present disclosure is hereinabove described with reference to the embodiments as illustrated in FIG. 1 and FIG. 2. Hereinafter, a skin color detection device according to the present disclosure is described.

Figure 3A:
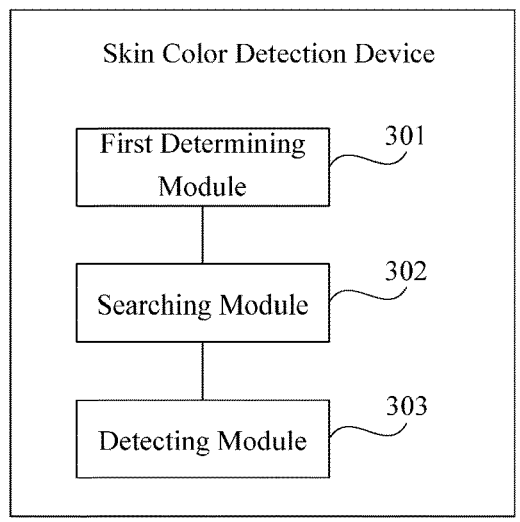
FIG. 3A is a schematic block diagram of a skin color detection device according to an embodiment of the present disclosure.

FIG. 3A is a schematic structural diagram of a skin color detection device according to an embodiment of the present disclosure. Referring to FIG. 3A, the skin color detection device comprises a first determining module 301, a searching module 302 and a detecting module 303.

The first determining module 301 is configured to determine chrominance signal values in a YUV domain of a pixel value corresponding to each pixel point in a target image under skin color detection.

The searching module 302 is configured to search for a skin color probability corresponding to the chrominance signal values in a stored skin color index matrix based on the chrominance signal values in the YUV domain of the pixel value corresponding to the pixel point.

The skin color index matrix is generated through processing skin color images under various illumination conditions, and the skin color probability refers to a probability that the pixel point is a skin color point.

The detecting module 303 is configured to perform skin color detection based on the skin color probability corresponding to the chrominance signal values of each pixel point in the target image.

Figure 3B:
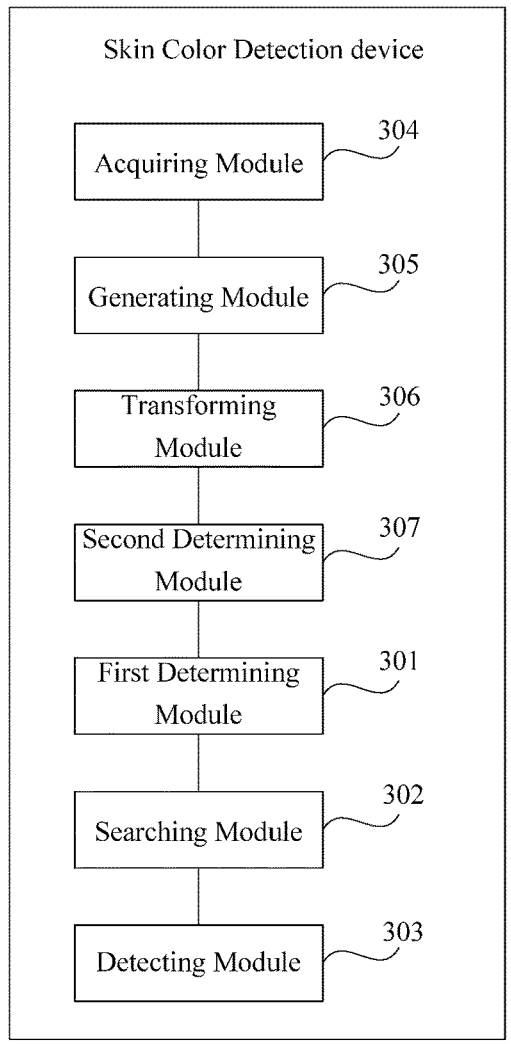
FIG. 3B is a schematic block diagram of a skin color detection device according to another embodiment of the present disclosure.

In some embodiments of the present disclosure, referring to FIG. 3B, the skin color detection device further comprises:

an acquiring module 304, configured to acquire images carrying the skin color points under various illumination conditions;

a generating module 305, configured to generate a binary image based on the chrominance signal values in the YUV domain of a pixel value of each skin color point in the image carrying the skin color points; and a transforming module 306, configured to obtain a distance matrix through distance transformation based on a pixel value of each pixel point in the binary image; and a second determining module 307, configured to determine the skin color index matrix based on the distance matrix.

Figure 3C:
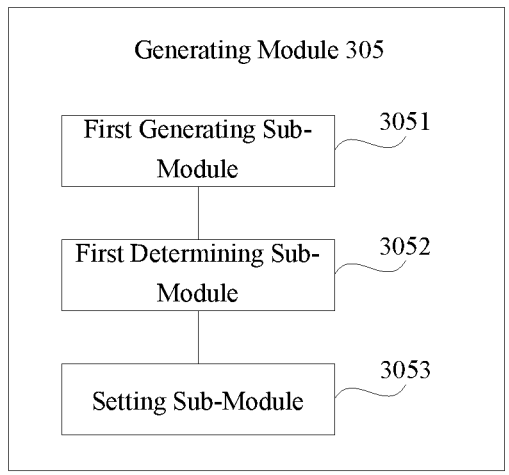
FIG. 3C is a schematic block diagram of a generating module 305 according to an embodiment of the present disclosure.

In some embodiments of the present disclosure, referring to FIG. 3C, the generating module 305 comprises:

a first generating sub-module 3051, configured to generate a chrominance signal value image, wherein chrominance signal values in the YUV domain of pixel values of pixel points in the chrominance signal value image are arranged in predetermined directions in an ascending order;

a first determining sub-module 3052, configured to determine, based on the chrominance signal values in the YUV domain of the pixel value of each skin color point in the image, a probability that each pixel point in the chrominance signal value image is the skin color point; and a setting sub-module 3053, configured to set the pixel value of the pixel point with the probability being greater than or equal to a predetermined pixel threshold in the chrominance signal value image as 1, and set the pixel value of the pixel point with the probability being less than the predetermined pixel threshold as 0, so as to obtain the binary image.

Figure 3D:
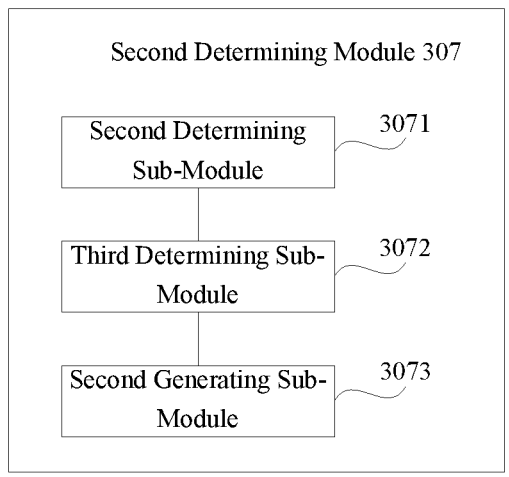
FIG. 3D is a schematic block diagram of a third determining module 307 according to an embodiment of the present disclosure.

In some embodiments of the present disclosure, referring to FIG. 3D, the second determining module 307 comprises:

a second determining sub-module 3071, configured to determine a maximum distance value in the distance matrix;

a third determining sub-module 3072, configured to determine a skin color probability corresponding to each distance in the distance matrix based on the distance matrix and the maximum distance value; and a second generating sub-module 3073, configured to generate the skin color index matrix based on the skin color probability corresponding to each distance in the distance matrix.

In some embodiments of the present disclosure, the third determining sub-module 3072 is configured to:

determine a skin color probability corresponding to each distance in the distance matrix based on the distance matrix and the maximum distance value through the following formula:

$$SkinValue = \exp\left(-\frac{dis * disThres}{\max dis}\right) * 255.0$$

In the above formula, SkinValue denotes a skin color probability corresponding to each distance in the distance matrix, dis denotes a distance in the distance matrix, disThres denotes a predetermined distance threshold, and max dis denotes a maximum distance value in the distance matrix.

In some embodiments of the present disclosure, the second generating sub-module 3073 is configured to:

generate, based on the skin color probability corresponding to each distance in the distance matrix, the skin color index matrix according to arrangement of the distance matrix; or round the skin color probability corresponding to each distance in the distance matrix, and generate, based on the rounded skin color probability, the skin color index matrix according to arrangement of the distance matrix.

In the embodiment of the present disclosure, as an image comprises a plurality of pixel points, skin color can be detected by determining whether the pixel points are skin color points. When skin color detection needs to be performed on a target image, with respect to each pixel point in the target image, chrominance signal values in the YUV domain of the pixel value of the pixel point can be determined, such that a skin color probability corresponding to the chrominance signal values is searched for in a stored skin color index matrix based on the chrominance signal values in the YUV domain of the pixel value corresponding to the pixel point, and hence skin color detection is performed based on the skin color probability corresponding to the chrominance signal values of each pixel point in the target image. Since with respect to any image or video frame, a probability that a pixel point is a skin color point can be quickly searched in the skin color index matrix based on the chrominance signal values of the pixel point, which is applicable to application scenarios such as retouching video and the like where real-time performance is strictly required. In addition, since the generated skin color index matrix is obtained through continuous distance transformations, the skin color probabilities in the obtained skin color index matrix are also continuous. Accordingly, with respect to a video frame, since the skin color probabilities obtained due to constant variations of the pixel values in adjacent frames caused by factors such as lighting and the like are also constantly variable, and jumps due to use of the threshold may not be caused. Since the skin color index matrix is obtained through processing the skin color images under various illumination conditions, determining the probability that the pixel point in the target image is the skin color point through the skin color index matrix can be applicable to various illumination conditions. In this way, the problem that detection results under different illumination condition are inaccurate is avoided, the accuracy of skin color detection is improved, and it is convenient to perform various subsequent processing on the skin color point in the image.

It should be noted that, during skin color detection by the skin color detection device according to the above embodiments, the skin color detection device is just described by taking divisions of the above functional modules as an example. In practice, the functions may be assigned to different functional modules for implementation as required. To be specific, the internal structure of the device is divided into different functional modules to implement all or part of the functions as described above. In addition, the skin color detection device according to the above embodiments is based on the same inventive concept as the skin color detection method according to the embodiments of the present disclosure. The specific implementation is elaborated in the method embodiments, which is not repeated herein any further.

An exemplary embodiment further provides a non-transitory computer-readable storage medium having instructions stored thereon, for example, a memory comprising instructions. The instructions, when being executed by the processor of the apparatus, may cause the processor to perform the above method. For example, the non-transitory computer-readable storage medium may be a read-only memory (ROM), a random access memory (RAM), a compact disc ROM (CD-ROM), a magnetic tape, a floppy disk, an optical data storage device or the like.

That is, the instructions stored on the computer-readable storage medium, when being executed by the processor of the apparatus, may cause the processor to perform the method as illustrated in FIG. 1 or FIG. 2.

In the above embodiments, the technical solutions may be totally or partially practiced by software, hardware, firmware or any combination thereof. During practice by software, the technical solutions may be totally or partially implemented in the form of a computer program product. The computer program product comprises one or a plurality of computer-executable instructions. The instructions, when being loaded and executed on a computer, may cause the computer to totally or partially perform the procedures or functions in the embodiments of the present disclosure. The computer may be a general computer, a dedicated computer, a computer network, or other programming device. The computer-executable instructions may be stored in a computer-readable storage medium, or transferred from one computer-readable storage medium to another. For example, the computer-executable instructions may be transmitted from one website, computer, server or data center to another in a wired fashion (for example, a coaxial cable, an optical fiber, a digital subscriber line (DSL) or a wireless fashion (for example, an infrared ray, a radio, a microwave or the like). The computer-readable storage medium may be any available medium that is accessible by a computer or a data storage device such as a server, a data center or the like integrated with one or a plurality of available media. The available medium may be a magnetic medium (for example, a floppy disk, a hard disk or a magnetic tape), an optical medium (for example, a digital versatile disc (DVD)), or a semiconductor medium (for example, a solid state disk (SSD)) or the like.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A skin color detection method, comprising:
    determining chrominance signal values in a luminance chrominance YUV domain of a pixel value corresponding to each pixel point in a target image under skin color detection;
    acquiring images carrying the skin color points under various illumination conditions;
    generating a binary image based on the chrominance signal values in the YUV domain of a pixel value of each skin color point in the acquired images carrying the skin color points;
    obtaining a distance matrix through distance transformation based on the pixel value of each pixel point in the binary image;
    determining the skin color index matrix based on the distance matrix;
    searching for a skin color probability corresponding to the chrominance signal values in the skin color index matrix based on the chrominance signal values in the YUV domain of the pixel value corresponding to the pixel point, wherein the skin color index matrix is generated through processing skin color images under various illumination conditions, and the skin color probability is a probability that the pixel point is a skin color point; and
    performing skin color detection based on the skin color probability corresponding to the chrominance signal values of each pixel point in the target image.

2. The method according to claim 1, wherein generating the binary image based on the chrominance signal values in the YUV domain of the pixel value of each skin color point in the image carrying the skin color points comprises:
    generating a chrominance signal value image, wherein chrominance signal values in the YUV domain of pixel values of pixel points in the chrominance signal value image are arranged in predetermined directions in an ascending order;
    determining, based on the chrominance signal values in the YUV domain of the pixel value of each skin color point in the image, a probability that each pixel point in the chrominance signal value image is the skin color point; and
    setting the pixel value of the pixel point with the probability being greater than or equal to a predetermined pixel threshold in the chrominance signal value image as 1, and setting the pixel value of the pixel point with the probability being less than the predetermined pixel threshold as 0, so as to obtain the binary image.

3. The method according to claim 1, wherein determining the skin color index matrix based on the distance matrix comprises:
    determining a maximum distance value in the distance matrix;
    determining a skin color probability corresponding to each distance in the distance matrix based on the distance matrix and the maximum distance value; and
    generating the skin color index matrix based on the skin color probability corresponding to each distance in the distance matrix.

4. The method according to claim 3, wherein determining the skin color probability corresponding to each distance in the distance matrix based on the distance matrix and the maximum distance value comprises:
    determining the skin color probability corresponding to each distance in the distance matrix based on the distance matrix and the maximum distance value through a following formula:

$$SkinValue = \exp\left(-\frac{dis * disThres}{\max dis}\right) * 255.0$$

wherein SkinValue denotes a skin color probability corresponding to each distance in the distance matrix, dis denotes a distance in the distance matrix, disThres denotes a predetermined distance threshold, and max dis denotes a maximum distance value in the distance matrix.

5. The method according to claim 4, wherein generating the skin color index matrix based on the skin color probability corresponding to each distance in the distance matrix comprises:
generating, based on the skin color probability corresponding to each distance in the distance matrix, the skin color index matrix according to arrangement of the distance matrix; or
rounding the skin color probability corresponding to each distance in the distance matrix, and generating, based on the rounded skin color probability, the skin color index matrix according to arrangement of the distance matrix.

6. The method according to claim 3, wherein generating the skin color index matrix based on the skin color probability corresponding to each distance in the distance matrix comprises:
generating, based on the skin color probability corresponding to each distance in the distance matrix, the skin color index matrix according to arrangement of the distance matrix; or
rounding the skin color probability corresponding to each distance in the distance matrix, and generating, based on the rounded skin color probability, the skin color index matrix according to arrangement of the distance matrix.

7. A skin color detection apparatus, comprising a processor, a memory and at least one program code stored on the memory and executable by the processor; wherein the processor, when executing the at least one program code, is configured to:
determine chrominance signal values in a luminance chrominance YUV domain of a pixel value corresponding to each pixel point in a target image under skin color detection;
acquire images carrying the skin color points under various illumination conditions;
generate a binary image based on the chrominance signal values in the YUV domain of a pixel value of each skin color point in the acquired images carrying the skin color points;
obtain a distance matrix through distance transformation based on the pixel value of each pixel point in the binary image;
determine the skin color index matrix based on the distance matrix;
search for a skin color probability corresponding to the chrominance signal values in the skin color index matrix based on the chrominance signal values in the YUV domain of the pixel value corresponding to the pixel point, wherein the skin color index matrix is generated through processing skin color images under various illumination conditions, and the skin color probability is a probability that the pixel point is a skin color point; and
perform skin color detection based on the skin color probability corresponding to the chrominance signal values of each pixel point in the target image.

8. The skin color detection apparatus according to claim 7, wherein, when the processor is configured to generate the binary image based on the chrominance signal values in the YUV domain of the pixel value of each skin color point in the image carrying the skin color points, the processor is configured to
generate a chrominance signal value image, wherein chrominance signal values in the YUV domain of pixel values of pixel points in the chrominance signal value image are arranged in predetermined directions in an ascending order;
determine, based on the chrominance signal values in the YUV domain of the pixel value of each skin color point in the image, a probability that each pixel point in the chrominance signal value image is the skin color point; and
set the pixel value of the pixel point with the probability being greater than or equal to a predetermined pixel threshold in the chrominance signal value image as 1, and set the pixel value of the pixel point with the probability being less than the predetermined pixel threshold as 0, so as to obtain the binary image.

9. The skin color detection apparatus according to claim 7, wherein, when the processor is configured to determine the skin color index matrix based on the distance matrix, the processor is configured to:
determine a maximum distance value in the distance matrix;
determine a skin color probability corresponding to each distance in the distance matrix based on the distance matrix and the maximum distance value; and
generate the skin color index matrix based on the skin color probability corresponding to each distance in the distance matrix.

10. The skin color detection apparatus according to claim 9, wherein, when the processor is configured to determine the skin color probability corresponding to each distance in the distance matrix based on the distance matrix and the maximum distance value, the processor is configured to:
determine the skin color probability corresponding to each distance in the distance matrix based on the distance matrix and the maximum distance value through a following formula:

$$SkinValue = \exp\left(-\frac{dis * disThres}{\max dis}\right) * 255.0$$

wherein SkinValue denotes a skin color probability corresponding to each distance in the distance matrix, dis denotes a distance in the distance matrix, disThres denotes a predetermined distance threshold, and max dis denotes a maximum distance value in the distance matrix.

11. The skin color detection apparatus according to claim 10, wherein when the processor is configured to generate the skin color index matrix based on the skin color probability corresponding to each distance in the distance matrix the processor is configured to:
generate, based on the skin color probability corresponding to each distance in the distance matrix, the skin color index matrix according to arrangement of the distance matrix; or
round the skin color probability corresponding to each distance in the distance matrix, and generating, based on the rounded skin color probability, the skin color index matrix according to arrangement of the distance matrix.

12. The skin color detection apparatus according to claim 9, wherein when the processor is configured to generate the skin color index matrix based on the skin color probability corresponding to each distance in the distance matrix, the processor is configured to
  generate, based on the skin color probability corresponding to each distance in the distance matrix, the skin color index matrix according to arrangement of the distance matrix; or
  round the skin color probability corresponding to each distance in the distance matrix, and generating, based on the rounded skin color probability, the skin color index matrix according to arrangement of the distance matrix.

13. A computer-readable storage medium having at least one instruction stored thereon; wherein the at least one instruction, when being executed by a processor, the processor is configured to:
  determine chrominance signal values in a luminance chrominance YUV domain of a pixel value corresponding to each pixel point in a target image under skin color detection;
  acquire images carrying the skin color points under various illumination conditions;
  generate a binary image based on the chrominance signal values in the YUV domain of a pixel value of each skin color point in the acquired images carrying the skin color points;
  obtain a distance matrix through distance transformation based on the pixel value of each pixel point in the binary image;
  determine the skin color index matrix based on the distance matrix;
  search for a skin color probability corresponding to the chrominance signal values in the skin color index matrix based on the chrominance signal values in the YUV domain of the pixel value corresponding to the pixel point, wherein the skin color index matrix is generated through processing skin color images under various illumination conditions, and the skin color probability is a probability that the pixel point is a skin color point; and
  perform skin color detection based on the skin color probability corresponding to the chrominance signal values of each pixel point in the target image.

14. The computer-readable storage medium according to claim 13, wherein when the processor is configured to generate the binary image based on the chrominance signal values in the YUV domain of the pixel value of each skin color point in the image carrying the skin color points, the processor is caused to:
  generate a chrominance signal value image, wherein chrominance signal values in the YUV domain of pixel values of pixel points in the chrominance signal value image are arranged in predetermined directions in an ascending order;
  determine, based on the chrominance signal values in the YUV domain of the pixel value of each skin color point in the image, a probability that each pixel point in the chrominance signal value image is the skin color point; and
  set the pixel value of the pixel point with the probability being greater than or equal to a predetermined pixel threshold in the chrominance signal value image as 1, and set the pixel value of the pixel point with the probability being less than the predetermined pixel threshold as 0, so as to obtain the binary image.

15. The computer-readable storage medium according to claim 14, wherein when the processor is caused to determine the skin color probability corresponding to each distance in the distance matrix based on the distance matrix and the maximum distance value, the processor is caused to:
  determine the skin color probability corresponding to each distance in the distance matrix based on the distance matrix and the maximum distance value through a following formula:

$$SkinValue = \exp\left(-\frac{dis * disThres}{\max dis}\right) * 255.0$$

wherein SkinValue denotes a skin color probability corresponding to each distance in the distance matrix, dis denotes a distance in the distance matrix, disThres denotes a predetermined distance threshold, and max dis denotes a maximum distance value in the distance matrix.

16. The computer-readable storage medium according claim 15, wherein when the processor is caused to generate the skin color index matrix based on the skin color probability corresponding to each distance in the distance matrix, the processor is caused to
  generate, based on the skin color probability corresponding to each distance in the distance matrix, the skin color index matrix according to arrangement of the distance matrix; or
  round the skin color probability corresponding to each distance in the distance matrix, and generating, based on the rounded skin color probability, the skin color index matrix according to arrangement of the distance matrix.

17. The computer-readable storage medium according to claim 13, wherein when the processor is caused to determine the skin color index matrix based on the distance matrix, the processor is caused to:
  determine a maximum distance value in the distance matrix;
  determine a skin color probability corresponding to each distance in the distance matrix based on the distance matrix and the maximum distance value; and
  generate the skin color index matrix based on the skin color probability corresponding to each distance in the distance matrix.

18. The computer-readable storage medium according claim 17, wherein when the processor is caused to generate the skin color index matrix based on the skin color probability corresponding to each distance in the distance matrix, the processor is caused to
  generate, based on the skin color probability corresponding to each distance in the distance matrix, the skin color index matrix according to arrangement of the distance matrix; or
  round the skin color probability corresponding to each distance in the distance matrix, and generating, based on the rounded skin color probability, the skin color index matrix according to arrangement of the distance matrix.

* * * * *